UNITED STATES PATENT OFFICE.

PHILIP C. HOFFMANN, OF RICHMOND, VIRGINIA, ASSIGNOR TO THE VIRGINIA-CAROLINA CHEMICAL COMPANY, OF RICHMOND, VIRGINIA, A CORPORATION OF NEW JERSEY.

FERTILIZER AND PROCESS FOR MAKING THE SAME.

1,360,402.      Specification of Letters Patent.      Patented Nov. 30, 1920.

No Drawing.     Application filed August 10, 1920. Serial No. 402,668.

*To all whom it may concern:*

Be it known that I, PHILIP C. HOFFMANN, a citizen of the United States, residing at Richmond, in the county of Henrico, State of Virginia, have invented new and useful Improvements in Fertilizers and Processes for Making the Same, of which the following is a specification.

My invention has for its object to provide a new fertilizer in which the ammonia and phosphate content shall be present in a suitable ratio and condition for general use, and a new and economical process for the manufacture of the same, from cyanamids and dilute phosphoric acid, by which the full value of each of these ingredients as fertilizers may be made available in the product as plant food.

In my co-pending application, Serial No. 390,224, I have described a fertilizer and process for making the same by the treatment of cyanamids with liquid phosphoric acid. The present application differs from the foregoing in that by the use of a dilute phosphoric acid, for example, 20% acid, a different series of reactions is brought about and a different type of product is obtained, which, however, is equally valuable as fertilizer. According to my invention, commercial powdered calcium cyanamid, which usually contains about 20% of free lime, is treated with dilute phosphoric acid, for example, about 20% phosphoric acid, in such proportions as to bring about the reaction expressed by the following equation:

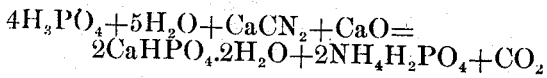

$$4H_3PO_4 + 5H_2O + CaCN_2 + CaO = 2CaHPO_4 \cdot 2H_2O + 2NH_4H_2PO_4 + CO_2$$

During the reaction the free lime in the cyanamid is acted upon by the phosphoric acid producing a one-half di-calcium phosphate. This is precipitated, filtered off and dried, the remaining liquid or filtrate, which consists principally of ammonium phosphate, is then evaporated and dried. These products either alone or in combination make excellent fertilizer ingredients, since all of the reaction products are highly soluble and are in a form rendering them available for use as plant food, useless by-products are almost entirely eliminated by this method and the cost of manufacture is therefore comparatively small. The di-calcium phosphate is found on analysis to yield about 25% of available phosphates and 2½% of ammonia. The ammonium phosphate is found to yield about 47% of available phosphates and 11% of ammonia.

It is obvious from the foregoing that variations may be made in the details of the process and product without departing from the spirit and scope of my invention.

What I claim is:

1. As a fertilizer, reaction products of calcium cyanamid and dilute phosphoric acid.

2. The process of preparing a fertilizer by treating calcium cyanamid with dilute phosphoric acid.

3. The process of treating calcium cyanamid with dilute phosphoric acid in such proportions as to convert it into di-calcium phosphate and ammonium phosphate.

PHILIP C. HOFFMANN.